United States Patent
Han et al.

(10) Patent No.: US 11,744,394 B2
(45) Date of Patent: Sep. 5, 2023

(54) UNCOVERING ASSEMBLY OF HOUSEHOLD APPLIANCE AND HOUSEHOLD APPLIANCE

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Xuedong Han, Zhuhai (CN); Jing He, Zhuhai (CN); Ji Li, Zhuhai (CN); Xin Lan, Zhuhai (CN); Zhilong Deng, Zhuhai (CN); Hongbin Liao, Zhuhai (CN); Chao Luo, Zhuhai (CN); Yi Zhang, Zhuhai (CN); Hongbing Wang, Zhuhai (CN)

(73) Assignees: GREE ELECTRIC APPLIANCES (WUHAN) CO., LTD, Hubei (CN); GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 755 days.

(21) Appl. No.: 16/756,203

(22) PCT Filed: Aug. 31, 2018

(86) PCT No.: PCT/CN2018/103554
§ 371 (c)(1),
(2) Date: Apr. 15, 2020

(87) PCT Pub. No.: WO2019/080649
PCT Pub. Date: May 2, 2019

(65) Prior Publication Data
US 2020/0329898 A1    Oct. 22, 2020

(30) Foreign Application Priority Data
Oct. 25, 2017  (CN) .......................... 201711024022.1

(51) Int. Cl.
*A47J 19/02* (2006.01)
*A47J 19/00* (2006.01)
(Continued)

(52) U.S. Cl.
CPC ................ *A47J 19/00* (2013.01); *A23N 1/02* (2013.01); *A47J 19/027* (2013.01);
(Continued)

(58) Field of Classification Search
CPC ................ A47J 27/0804; A47J 27/0806; A47J 27/0808; A47J 27/0813; A47J 27/0815; A47J 19/025; A47J 19/027; A23N 1/02
See application file for complete search history.

(56) References Cited

U.S. PATENT DOCUMENTS 2,314,586 A * 3/1943 Levinson ................. A23N 1/02
                                                    494/44
3,100,009 A * 8/1963 Drachenberg ........ A47J 19/027
                                                    99/511
(Continued)

FOREIGN PATENT DOCUMENTS

CN      1620970 A    6/2005
CN      2902107 Y    5/2006
(Continued)

OTHER PUBLICATIONS

International Search Report for corresponding International App. No. PCT/CN2018/103554, dated Nov. 19, 2018, 2 pages.

*Primary Examiner* — Reginald Alexander
(74) *Attorney, Agent, or Firm* — Armstrong Teasdale LLP

(57) ABSTRACT

Provided are an uncovering assembly of a household appliance, and a household appliance. A positioning portion cooperates with a positioning structure on a shell of the household appliance in the uncovering assembly, a cover is prevented from being loosened relative to the shell, in this (Continued)

way visual fool proofing may be achieved. A lock catch switches from an unfastening position to a fastening position after the positioning portion cooperates with the positioning structure. The lock catch, after entering the fastening position, is in mutual restriction with a fastening structure in a vertical direction.

17 Claims, 6 Drawing Sheets

(51) Int. Cl.
  *A47J 31/44* (2006.01)
  *A47J 36/10* (2006.01)
  *A23N 1/02* (2006.01)
  *B65D 55/00* (2006.01)

(52) U.S. Cl.
  CPC ............ *A47J 31/4407* (2013.01); *A47J 36/10* (2013.01); *A47J 19/025* (2013.01); *A47J 31/4403* (2013.01); *B65D 55/00* (2013.01)

(56) References Cited

U.S. PATENT DOCUMENTS

2005/0132894 A1    6/2005  Seurat Guiochet et al.
2017/0119189 A1*   5/2017  Kim ........................ A47J 19/06

FOREIGN PATENT DOCUMENTS

| | | | |
|---|---|---|---|
| CN | 1899170 A | 1/2007 | |
| CN | 201894546 U | 11/2010 | |
| CN | 102415812 A | 10/2011 | |
| CN | 102824102 A | 8/2012 | |
| CN | 103767528 A | 5/2014 | |
| CN | 106073489 A | 8/2016 | |
| CN | 206228185 U | 6/2017 | |
| CN | 206228186 U | 6/2017 | |
| CN | 208709284 U | 10/2017 | |
| DE | 3807188 A1 * | 11/1988 | .......... A47J 27/0804 |
| NR | 250332 * | 6/1948 | ............... A23N 1/02 |

\* cited by examiner

UNCOVERING ASSEMBLY OF HOUSEHOLD APPLIANCE AND HOUSEHOLD APPLIANCE

CROSS-REFERENCE TO RELATED APPLICATIONS

The present disclosure is a national stage application of International Patent Application No. PCT/CN2018/103554, filed on Aug. 31, 2018, which claims priority to Chinese Patent Application No. 201711024022.1, filed on Oct. 25, 2017, the contents of which are hereby incorporated by reference in their entirety.

TECHNICAL FIELD

The present disclosure relates to a technical field of household appliances, and in particular to an uncovering assembly for a household appliance and the household appliance with the uncovering assembly.

BACKGROUND

At present, uncovering assemblies of many household appliances need to be covered and opened frequently, and need to be in locked cooperating with household appliance bodies during covering. Taking an original juice machine as an example, the uncovering assembly needs to be locked during squeezing, and is opened after squeezing. The uncovering assembly of the original juice machine in the market takes a screwing structure at present. A cover is locked or opened through rotating the cover, and it is found during actual use that the screwing structure has the following defects: when the original juice machine squeezes, the cover continuously vibrates along a main machine, and is loosened in a direction opposite to a screwing direction thereof. Especially, when squeezing a hard food material (for example, a carrot piece), the cover is loosened more easily. Meanwhile, in order to prevent juice inside the main machine from flowing outward when the cover is loosened, a safety switch (a Hall device) is often arranged between the cover and the main machine. When the cover is loosened due to vibration of the main machine, the safety switch is triggered, in this way the safety switch of the motor is disconnected and the motor stops rotating, and a user has to restart the original juice machine for many times. The safety switch is invalid easily when the original juice machine is used for a certain period of time. If the cover is loosened during squeezing, an accident is caused easily. In addition, the screwing structure doesn't achieve visual fool proofing and easily cause a situation that the cover is not be mounted in place, and accordingly the user needs to mount the screwing structure for many times.

A device known to the inventors discloses a vertical screw extrusion juicer, including a main machine and a juice collecting plate. The juice collecting plate is mounted and fixed on the main machine. The juice collecting plate is provided with an upper cover which is in rotating connection with the juice collecting plate in an assembled mode. The juicer further includes a self-locking structure. The self-locking structure includes an upper limiting structure and a lower limiting structure. The upper limiting structure is arranged on the upper cover. The lower limiting structure is arranged on the main machine or the juice collecting plate. After the upper cover and the juice collecting plate are assembled in place, the upper limiting structure cooperates the lower limiting structure to lock the upper cover, so as to prevent the upper cover from rotating accidentally. Although the upper cover is prevented from rotating accidentally through cooperating of the upper limiting structure and the lower limiting structure in the device known to the inventors, a screwing assembling structure is still taken and has a defect that the visual fool proofing is not achieved, and it is easy to cause the situation that the cover is not mounted in place, and accordingly a user needs to mount the cover for many times.

Therefore, how to synchronously solve an unexpected rotation of the upper cover and the situation that the visual fool proofing is not achieved and the upper cover is not easily mounted in place has become an urgent technical problem for the inventors.

SUMMARY

Embodiments of the present disclosure provide an uncovering assembly for a household appliance, as to solve the problem that a cover is easily loosened and is not mounted in place during working of the uncovering assembly of the household appliance in the device known to the inventors.

Therefore, in a first aspect, the present disclosure provides an uncovering assembly of a household appliance, including a cover, a positioning portion arranged on the cover and cooperating with a positioning structure on a shell of the household appliance to prevent the cover from rotating relative to the shell, and a lock catch arranged on the cover in a manner of reciprocating movement between a fastening position and an unfastening position. The lock catch switches from the unfastening position to the fastening position after the positioning portion cooperates with the positioning structure. A fastening end of the lock catch at the fastening position extends out of the cover to cooperate with a fastening structure on the shell in a fastening manner, as to prevent the cover from moving vertically relative to the shell.

The uncovering assembly of the household appliance further includes an unfastening assembly having a switching part movably arranged on the cover, and a transmission mechanism arranged between the switching part and the lock catch and arranged to drive the lock catch to switch between the fastening position and the unfastening position.

The uncovering assembly of the household appliance further includes a slideway fixedly arranged on the cover, and the lock catch is arranged inside the slideway slidably.

The uncovering assembly of the household appliance is characterized in that the slideway is a linear type slideway.

The slideway is formed by guiding ribs arranged on two sides of a motion path of the lock catch.

The fastening end of the lock catch at the fastening position extends to a place under the fastening structure of the shell to cooperate with the fastening structure in the fastening manner.

The lock catch is a tripod structure, a top end of the tripod structure is connected with the transmission structure, and a bottom side opposite to the top end is the fastening end.

The switching part has a first position and a second position, wherein, the first position corresponds to the fastening position of the lock catch, and the second position corresponds to the unfastening position of the lock catch.

The uncovering assembly of the household appliance further includes a switching part sliding groove arranged on the cover fixedly, and the switching part is a sliding block arranged inside the switching part sliding groove slidably.

The sliding block is provided with two elastic fasteners, and sawtooth grooves corresponding to the two elastic fasteners are moulded inside the switching part sliding groove. When the sliding block switches between the first position and the second position, the two elastic fasteners get close to each other and jump into a sawtooth grooves that are in front of a motion path.

A switching lock catch is arranged between the sliding block and the switching part sliding groove, and mounted on the switching part sliding groove slidably. The switching lock catch has a clamping position for locking the sliding block on the switching part sliding groove and a free position for enabling the sliding block to slide along the switching part sliding groove freely.

The switching lock catch has a block rib. When the switching lock catch moves to the clamping position from the free position, the block rib blocks between the two elastic fasteners, as to prevent the elastic fastener from being deformed and jumping into adjacent sawteeth.

Block rib grooves are moulded on the two elastic fasteners, respectively. When the block rib moves to the clamping position, the block rib enters into the block rib grooves to limit movement of the block rib.

A first boss is arranged on the switching lock catch, and a second boss is arranged on a location of the switching part sliding groove corresponding to the first boss. The second boss is arranged to limit the first boss to moving continuously when the switching part moves to the free position.

The switching part is a rotary disc rotatably connected with the cover.

The transmission mechanism has a connecting rod. One end of the connecting rod is pivotally connected with the lock catch, and another end thereof is pivotally connected with the switching part. A switching action of the switching part between the first position and the second position through the connecting rod is converted to switching movement of the lock catch from the fastening position to the unfastening position.

The transmission mechanism includes: a first gear, a connecting rod and at least one transmission gear, herein the first gear is arranged on the rotary disc, one end of the connecting rod is fixedly connected with the lock catch and another end is provided with a rack structure, and one end of the at least one transmission gear is in meshed connection with the first gear and another end is in meshed connection with the rack structure.

The at least one transmission gear includes a third gear and a fourth gear rotating coaxially. The third gear is meshed with the first gear, and the fourth gear is meshed with the rack structure.

A waist-type hole is moulded on the rotary disc, and a fixed column passes through the waist-type hole to connect to the cover. Through a cooperation of the fixed column and the waist-type hole, the rotary disc rotates within a scope between the first position and the second position.

There are two waist-type holes symmetrically arranged relative to a center of the rotary disc.

The fixed column is a screw.

The cover is provided with a biasing part having a biasing force far away from a direction of the cover. A first embedding hole corresponding to the first position and a second embedding hole corresponding to the second position are moulded on the rotary disc, and the biasing part is embedded into the first embedding hole or the second embedding hole to stabilize the rotary disc at the first position and the second position.

A drive shaft is arranged on a side, far away from the cover, of the rotary disc, and a through hole is moulded inside the drive shaft along an axial direction. An external force is applied to an inner part of the through hole, in this way the drive shaft drives the rotary disc to rotate.

Two groups of transmission mechanisms are taken and are symmetrically arranged relative to the unfastening assembly.

The present disclosure further provides a household appliance, including: a shell and an uncovering assembly. Herein, the shell is provided with a positioning structure and a fastening structure, and a positioning portion of the uncovering assembly cooperates with the positioning structure, as to prevent a cover from rotating relative to the shell. A fastening end of a lock catch at a fastening position extends out of the cover to cooperate with the fastening structure on the shell in a fastening manner, as to prevent the cover from vertically moving relative to the shell.

The positioning portion is a limiting rib moulded on a periphery of the cover and arranged to face the shell, and the positioning structure is a limiting grooving cooperating with the limiting rib or the positioning portion is a limiting groove moulded on a periphery of the cover and arranged to face the shell, and the positioning structure is a limiting rib cooperating with the limiting groove.

The positioning portion and the positioning structure are a pair of magnetic assemblies attracting each other.

The fastening structure is at least one block rib arranged to protrude inward along a periphery of an opening of the shell. The fastening end of the lock catch at the fastening position extends to a place under the corresponding block rib and contacts with the block rib.

The household appliance is a juicer.

The juicer is an original juice machine.

The present disclosure has the following advantages.

1. The uncovering assembly provided by the present disclosure cooperates with the positioning structure on the shell of the household appliance through the positioning portion, as to prevent the cover from being loosened relative to the shell. In this way, visual fool proofing is achieved. Meanwhile, the lock catch switches from the unfastening position to the fastening position after the positioning portion cooperates with the positioning structure. The lock catch, after entering into the fastening position, is in mutual restriction with the fastening structure in a vertical direction, in this way the cover is prevented from moving vertically relative to the shell.

2. With the adoption of the uncovering assembly provided by the present disclosure, the unfastening assembly has the switching part movably arranged on the cover, and the transmission mechanism arranged between the switching part and the lock catch and configured to drive the lock catch to switch between the fastening position and the unfastening position.

A user directly control the switching part and transmit an action of the switching part to the lock catch through the transmission mechanism, in this way the lock catch completes the action of fastening or unfastening and accordingly completes connection or separation of the shell and the cover. Through the switching part and the transmission mechanism, an operation of controlling the shell and the cover becomes simple.

3. The uncovering assembly provided by the present disclosure further includes the slideway fixedly arranged on the cover, and the lock catch is arranged inside the slideway slidably. Through the slideway, a motion trail of the lock catch is restricted, as to prevent the motion path of the lock catch from biasing. In this way, the lock catch cooperates with the fastening structure accurately, and connection accuracy of the lock catch and the fastening structure is improved accordingly.

4. With the adoption of the uncovering assembly provided by the present disclosure, the slideway is formed by the guiding ribs arranged on the two sides of the motion path of the lock catch. The lock catch is ensured to move along a predetermined path through restriction on areas on the two sides of the motion path of the lock catch.

5. With the adoption of the uncovering assembly provided by the present disclosure, the lock catch is the tripod structure, the top end of the tripod structure is connected with the transmission structure, and the bottom side opposite to the top end is the fastening end. A triangle is a stable structure and keeps stability of its own structure in presence of force, and stable transmission is on the basis of structural stability. Through a triangle structure, the lock catch is kept stable during many times of fastening and unfastening.

6. With the adoption of the uncovering assembly provided by the present disclosure, the switching part is the sliding block arranged inside the switching part sliding groove slidably. Through the switching part sliding groove, a frictional force that the switching part is subjected is reduced, and accordingly smoothness of the sliding block during movement is improved.

7. With the adoption of the uncovering assembly provided by the present disclosure, the sliding block is provided with the two elastic fasteners, and the sawtooth grooves corresponding to the elastic fasteners are moulded inside the switching part sliding groove. When the sliding block switches between the first position and the second position, the two elastic fasteners get close to each other and jump inside the sawtooth grooves that are in front of the motion path of the two elastic fasteners.

The sliding block is provided with the elastic fasteners. When the sliding block reciprocates between the first position and the second position, the elastic fasteners move in the sawtooth grooves. A concave area for accommodating each of the elastic fasteners is arranged between two adjacent sawteeth of each of the sawtooth grooves. After entering into the concave area, each of the elastic fastener is blocked by the sawtooth which is in front of the motion path of the elastic fastener, and blocked from moving further. Through the cooperation of the elastic fasteners and the sawtooth grooves, the sliding block is stabilized at any position between the first position and the second position, thereby improving flexibility of the sliding block during movement.

8. With the adoption of the uncovering assembly provided by the present disclosure, the switching lock catch has the block rib. When the switching lock catch moves to the clamping position from the free position, the block rib blocks between the two elastic fasteners. When two elastic fasteners don't get close to each other, the elastic fastener don't jump out of the concave area and jump inside the adjacent sawteeth as well. In this way, the sliding block is locked.

9. With the adoption of the uncovering assembly provided by the present disclosure, the first boss is arranged on the switching lock catch, and the second boss is arranged on the location of the switching part sliding groove corresponding to the first boss. The second boss is configured to limit the first boss to moving continuously when the switching part moves to the free position. In this way, the switching lock catch is prevented from dropping out of the switching part sliding groove.

10. With the adoption of the uncovering assembly provided by the present disclosure, the transmission mechanism includes the first gear arranged on the rotary disc, the connecting rod, one end of the connecting rod being fixedly connected with the lock catch, and another end being provided with the rack structure, and the at least one transmission gear, one end of the at least one transmission gear is in meshed connection with the first gear and another end is in meshed connection with the rack structure.

Through the cooperation between the gears and the cooperation between the gear and the rack structure, stable rotation of the rotary disc is converted to translational motion of the connecting rod.

11. With the adoption of the uncovering assembly provided by the present disclosure, the waist-type hole is moulded on the rotary disc, and the fixed column passes through the waist-type hole to connect to the cover. Through the cooperation of the fixed column and the waist-type hole, the rotary disc is limited between the first position and the second position, and accordingly the lock catch is limited to move between the unfastening position and the fastening position. In this way, it is conducive to preventing the lock catch from excessive movement.

12. With the adoption of the uncovering assembly provided by the present disclosure, the two waist-type holes are symmetrically arranged relative to the center of the rotary disc. In this way, the rotary disc is symmetrically restricted, and accordingly the rotary disc is prevented from inclining due to an uneven stress when a single side is restricted.

13. With the adoption of the uncovering assembly provided by the present disclosure, the cover is provided with the biasing part having the biasing force far away from the direction of the cover. The first embedding hole corresponding to the first position and second embedding hole corresponding to the second position are moulded on the rotary disc. The biasing part is embedded into the first embedding hole when rotating to the first position, and embedded into the second embedding hole when rotating to the second position. Through the cooperation of the biasing part and the different embedding holes, the rotary disc is stabilized at the first position or the second position, and accordingly the lock catch is ensured to be stabilized at the unfastening position or the fastening position. Therefore, it is conducive to stably connecting or separating the shell and the cover.

BRIEF DESCRIPTION OF THE DRAWINGS

Features and advantages of the present disclosure is more clearly understood with reference to the drawings, and the drawings are exemplary and should not be understood to limit the present disclosure. In the drawings.

1. Cover; 2. Lock catch; 3. Fastening structure; 4. Unfastening structure; 5. Slideway; 51. Guiding rib; 6. Switching part sliding groove; 61. Second boss; 7. Elastic fastener; 71. Block rib groove; 8. Sawtooth groove; 9. Sliding block; 10. Switching lock catch; 101. Block rib; 102. First boss; 11. Rotary disc; 111. Waist-type hole; 12. Connecting rod; 13. First gear; 14. Rack structure; 151. Third gear; 152. Fourth gear; 16. Fixed column; 17. Biasing part; 18. Drive shaft; 181. Through hole; 19. shell; 20. Limiting rib; 21. Limiting groove.

DETAILED DESCRIPTION OF THE EMBODIMENTS

Figure 1:
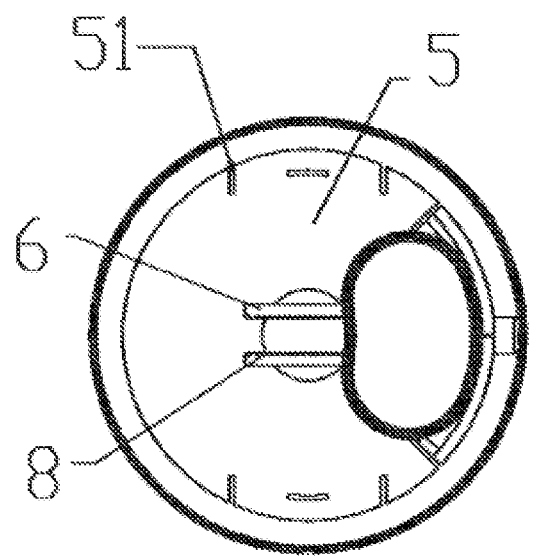
FIG. 1 is a structure diagram of a cover provided in a first embodiment according to the present disclosure.
Figure 2:
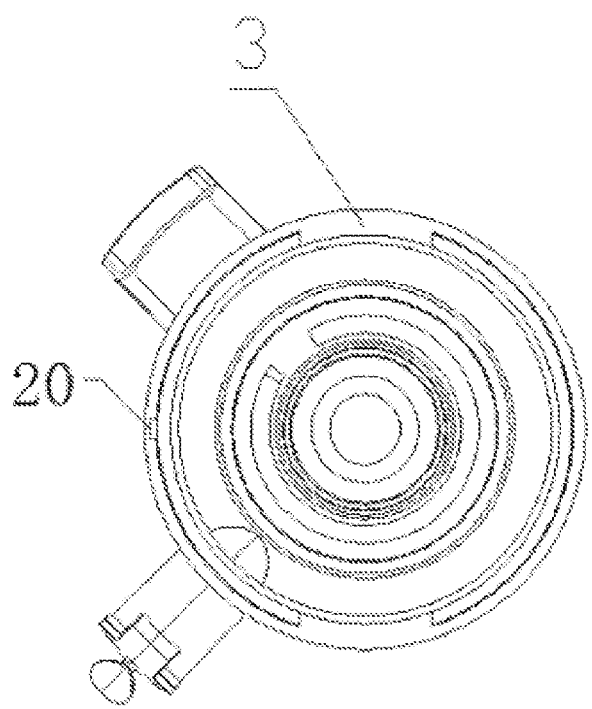
FIG. 2 is a schematic diagram of a fastening structure and a limiting rib on a shell provided according to the present disclosure.

In the descriptions of the present disclosure, it is to be noted that orientation or position relationships indicated by terms "center", "upper", "lower", "left", "right", "vertical", "horizontal", "inner", "outer" and the like are orientation or position relationships shown in the drawings are adopted not to indicate or imply that indicated devices or components are in specific orientations or structured and operated in specific orientations but only to conveniently describe the utility model and simplify descriptions and thus should not be understood as limits to the utility model. In addition, terms "first", "second" and "third" are only adopted for description and should not be understood to indicate or imply relative importance.

In the descriptions of the utility model, it is to be noted that, unless otherwise definitely specified and limited, terms "mount", "mutually connect" and "connect" should be broadly understood. For example, the terms refer to fixed connection and also refer to detachable connection or integration. The terms refer to mechanical connection and also refer to electrical connection. The terms refer to direct mutual connection, also refer to indirect connection through a medium and refer to communication in two components. For those of ordinary skill in the art, specific meanings of these terms in the utility model are understood according to a specific condition.

In addition, the technical features involved in different embodiments of the present disclosure described below are combined without conflicts.

In combination with those shown in FIG. 1-FIG. 10, according to embodiments of the disclosure, an uncovering assembly of a household appliance is provided.

Specifically, in a first embodiment:

The embodiment provides an uncovering assembly of a household appliance. As shown in any one of FIG. 1-FIG. 6, the uncovering assembly includes: a cover 1, a positioning portion arranged on the cover 1 and cooperating with a positioning structure on a shell 19 of the household appliance to prevent the cover 1 from rotating relative to the shell 19, and a lock catch 2 arranged on the cover 1 in a manner of reciprocating between a fastening position and an unfastening position. The lock catch 2 switches from the unfastening position to the fastening position after the positioning portion cooperates with the positioning structure. A fastening end of the lock catch 2 at the fastening position extends out of the cover 1 to cooperate with a fastening structure 3 of the shell 19 in a fastening manner, as to prevent the cover 1 from moving vertically relative to the shell 19.

In some embodiments, the uncovering assembly of the household appliance further includes an unfastening assembly 4 having a switching part movably arranged on the cover 1, and a transmission mechanism arranged between the switching part and the lock catch 2 and configured to drive the lock catch 2 to switch between the fastening position and the unfastening position.

A user directly controls the switching part and transmit an action of the switching part to the lock catch 2 through the transmission mechanism, in this way the lock catch 2 completes the action of fastening or unfastening and accordingly completes connection or separation of the shell 19 and the cover 1. Through the switching part and the transmission mechanism, an operation of controlling the shell 19 and the cover 1 becomes simple.

Figure 4:
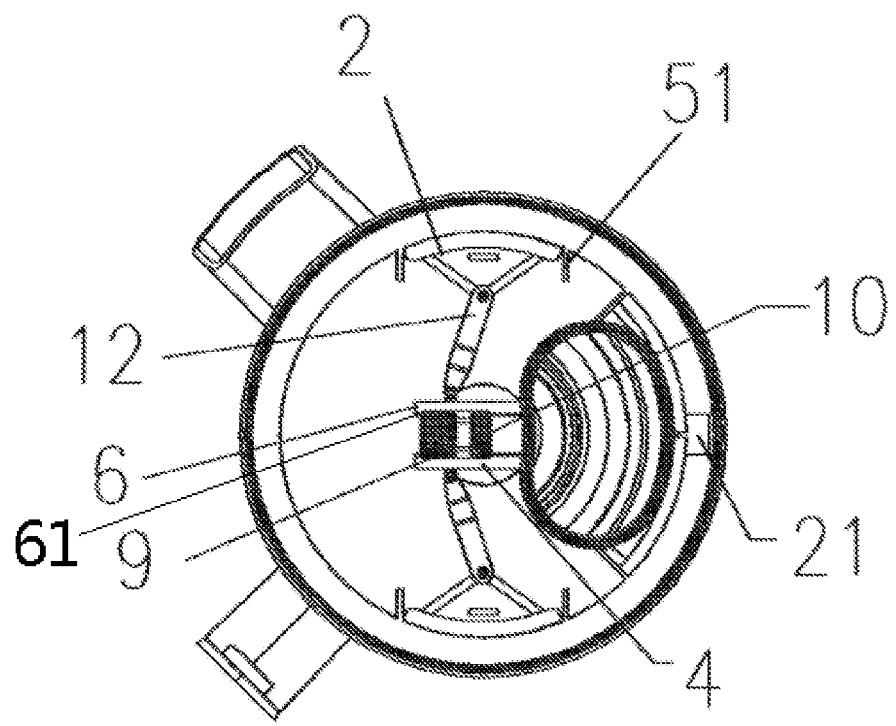
FIG. 4 is a schematic diagram of an unfastening assembly and a lock catch provided in the first embodiment according to the present disclosure at a fastening position.
Figure 5:
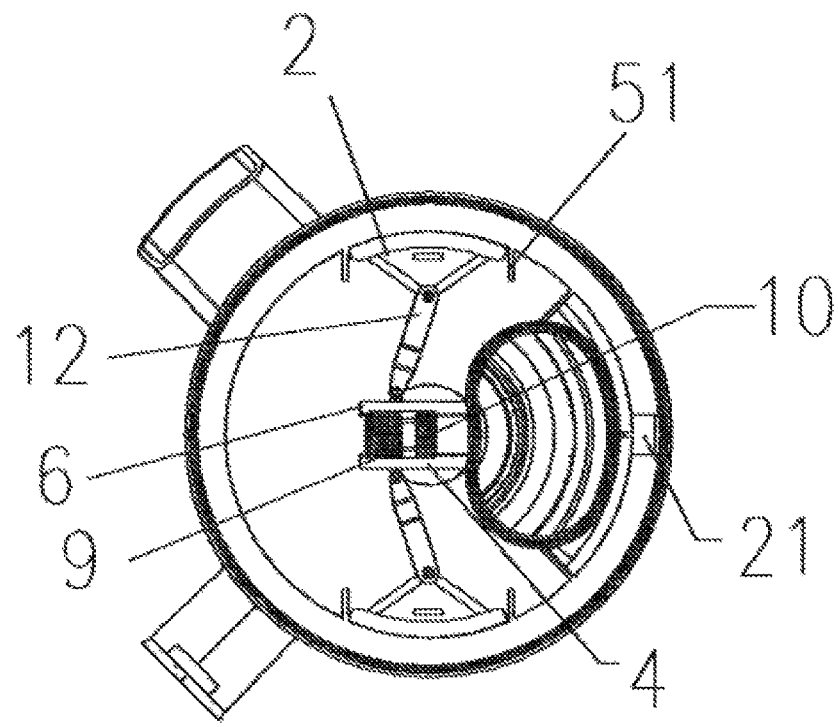
FIG. 5 is a schematic diagram of an unfastening assembly and a lock catch provided in the first embodiment according to the present disclosure at an unfastening position.
Figure 6:
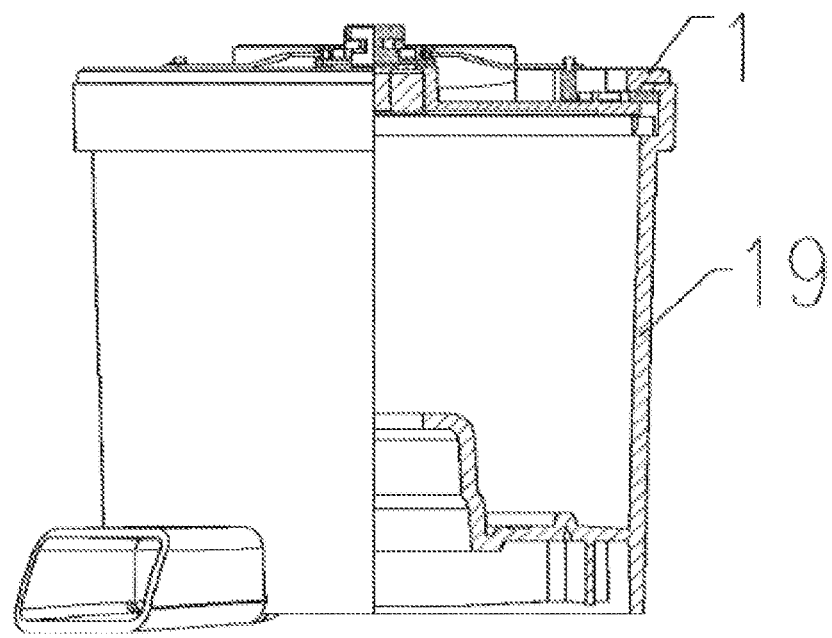
FIG. 6 is a structure diagram of an original juice machine adopting an uncovering assembly provided in a first embodiment according to the present disclosure.

In the embodiment, as shown in FIG. 4 or FIG. 5, the transmission mechanism has a connecting rod 12. One end of the connecting rod 12 is pivotally connected with the lock catch 2 and another end is pivotally connected with the switching part. A switching action of the switching part between the first position and the second position through the connecting rod 12 is converted to switching movement of the lock catch 2 from the fastening position to the unfastening position.

As shown in FIG. 1, the uncovering assembly of the household appliance further includes a slideway 5 fixedly arranged on the cover 1, and the lock catch 2 is arranged inside the slideway 5 slidably. The slideway 5 is a linear type slideway 5.

Specifically, the slideway 5 is formed by guiding ribs 51 arranged on two sides of a motion path of the lock catch 2. Meanwhile, the guiding rib 51 is made of plastic or rubber.

In the embodiment, the fastening end of the lock catch 2 at the fastening position extends to a place under a fastening structure 3 of the shell 19 to cooperate with the fastening structure 3 in the fastening manner. Specifically, as shown in FIG. 4 or FIG. 5, the lock catch 2 is a tripod structure, a top end of the tripod structure is connected with the transmission structure, and a bottom side opposite to the top end is the fastening end.

In the embodiment, the switching part has a first position and a second position, wherein, the first position corresponds to the fastening position of the lock catch 2, and the second position corresponds to the unfastening position of the lock catch 2.

Specifically, as shown in FIG. 4 or FIG. 5, the uncovering assembly further includes a switching part sliding groove 6 arranged on the cover 1 fixedly, and the switching part is a sliding block 9 arranged inside the switching part sliding groove 6 slidably. Through the switching part sliding groove 6, a frictional force that the switching part is subjected is reduced, and accordingly smoothness of the sliding block during movement is improved.

Figure 3:
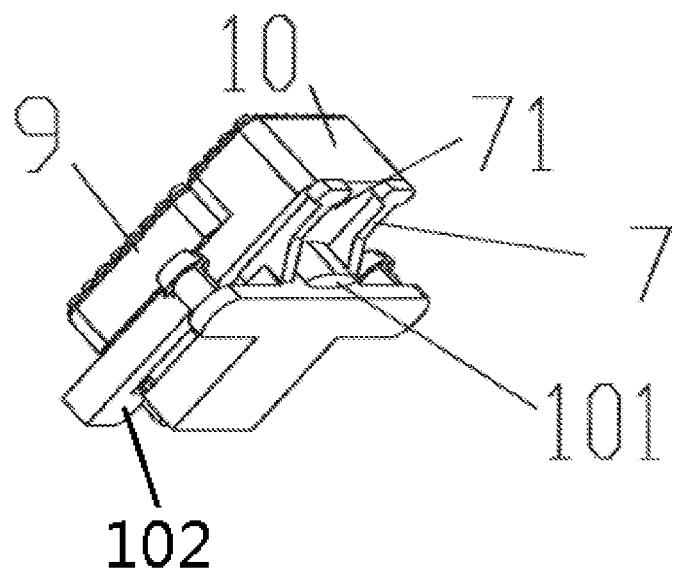
FIG. 3 is a structure diagram of an unfastening assembly provided in the first embodiment according to the present disclosure.

Meanwhile, as shown in FIG. 3 or FIG. 4, the sliding block 9 is provided with two elastic fasteners 7, and sawtooth grooves 8 corresponding to the elastic fastener 7 are moulded inside the switching part sliding groove 6. When the sliding block 9 switches between the first position and the second position, the two elastic fasteners 7 get close to each other and jump into sawtooth grooves that are in front of the motion path of the two elastic fasteners 7.

As shown in FIG. 3 or FIG. 4, the sliding block 9 is provided with the elastic fasteners 7. When the sliding block 9 reciprocates between the first position and the second position, the elastic fasteners 7 moves inside the sawtooth grooves 8. A concave area for accommodating each of the elastic fastener 7 is arranged between two adjacent sawteeth of each of the sawtooth grooves 8. After entering into the concave area, each of the elastic fastener 7 is blocked by the sawtooth which is in front of the motion path of the elastic fastener 7, and blocked from moving further. Through the cooperation of the elastic fasteners 7 and the sawtooth grooves 8, the sliding block 9 is stabilized at any position between the first position and the second position, thereby improving flexibility of the sliding block 9 during movement.

In order to fix the sliding block 9 at a specific position in the switching part sliding groove 6, a switching lock catch 10 is arranged between the sliding block 9 and the switching part sliding groove 6 in some embodiments, and the switching lock catch 10 is slidably mounted on the switching part sliding groove 6. The switching lock catch 10 has a clamping position locking the sliding block 9 in the switching part sliding groove 6, and a free position enabling the sliding block 9 to slide freely along the switching part sliding groove 6.

Specifically, the sliding block 9 is provided with the two elastic fasteners 7, and the sawtooth grooves 8 corresponding to the elastic fasteners 7 are moulded inside the switching part sliding groove 6. When the sliding block 9 switches between the first position and the second position, the two elastic fasteners 7 get close to each other and jump into the sawtooth grooves that are in front of the motion path.

Specifically, the two elastic fasteners 7 are made of a soft material. When the sliding block 9 moves along the switching part sliding groove 6, the two elastic fasteners 7 get close to each other first. When the two elastic fasteners 7 breaks away from restriction of the sawtooth grooves 8 after getting close to each other, meanwhile the sliding block 9 moves along the switching part sliding groove 6. When the elastic fasteners 7 moves to an inner part of a next sawtooth grooves 8, the two elastic fasteners 7 moves away from each other, and are restricted by the sawtooth grooves 8 again. In this way, the sliding block 9 is stabilized at the specific position of the switching part sliding groove 6.

In order to lock the sliding block 9 at the specific position of the switching part sliding groove 6, block rib grooves 71 are moulded on the two elastic fasteners 7, respectively. When moving to the clamping position, a block rib 101 enters into the block rib grooves 71 to limit movement of the block ribs 101. Specifically, when the switching lock catch 10 moves to the clamping position from the free position, the block rib 101 blocks between the two elastic fasteners 7. When the two elastic fasteners 7 don't get close to each other, the elastic fasteners 7 don't jump out of the concave areas and jump into the adjacent sawteeth accordingly. In this way, the sliding block 9 is locked.

Meanwhile, in the embodiment, as shown in FIG. 3 or FIG. 4, a first boss 102 is arranged on the switching lock catch 10, and a second boss 61 is arranged on a location, corresponding to the first boss 102, of the switching part sliding groove 6. The second boss 61 is configured to limit the first boss 102 to move continuously when the switching lock catch moves to the free position. In this way, the switching lock catch 10 is prevented from dropping out of the switching part sliding groove 6.

Specifically, in some embodiments, there are two groups of transmission mechanisms symmetrically arranged relative to the unfastening assembly 4. Each group of the transmission mechanisms are connected with one lock catch 2, respectively.

As a variation, more than two groups of transmission mechanisms are arranged. When there are three groups of transmission mechanisms, an included angle formed between two adjacent groups of transmission mechanisms is 120°. When there are four groups of transmission mechanisms, an included angle formed between two adjacent groups of transmission mechanisms is 90°. These variations will not be listed one by one herein.

Second Embodiment

In the embodiment, a switching part is a rotary disc 11 rotatably connected with a cover 1.

Figure 7:
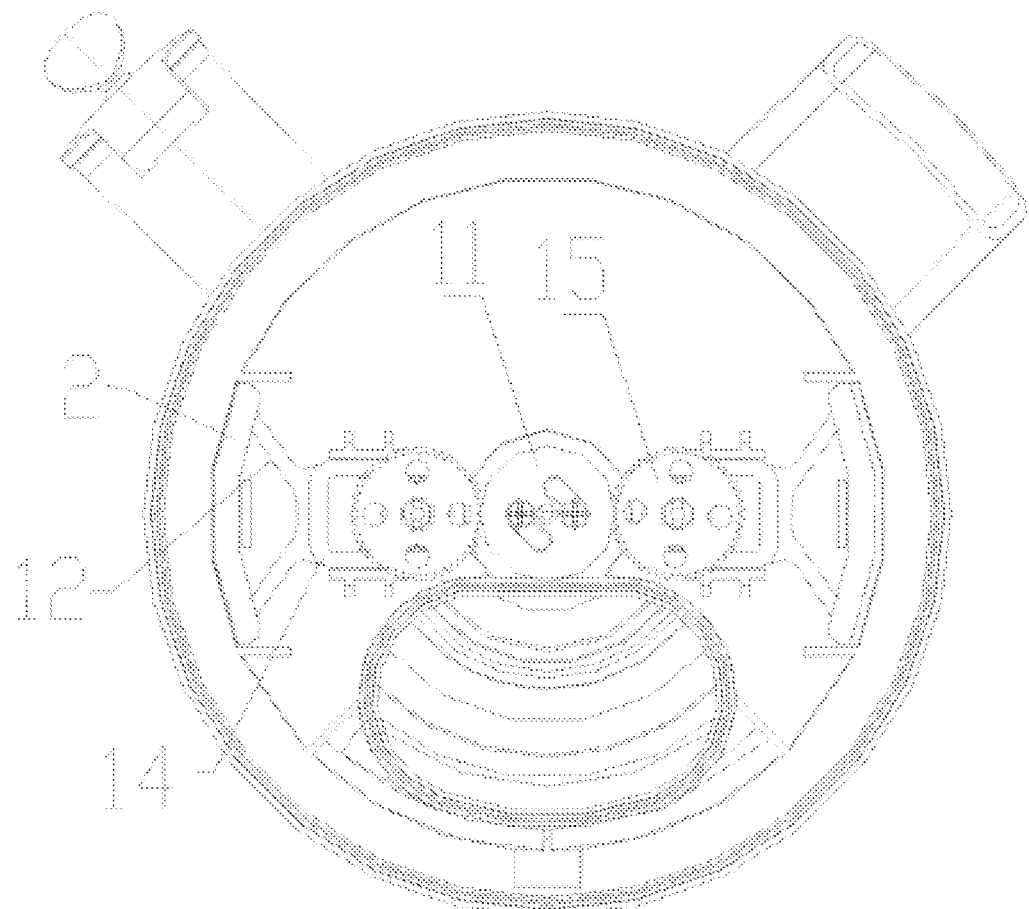
FIG. 7 is a schematic diagram of a first unfastening assembly and a lock catch provided in a second embodiment according to the present disclosure at a fastening position.
Figure 8:
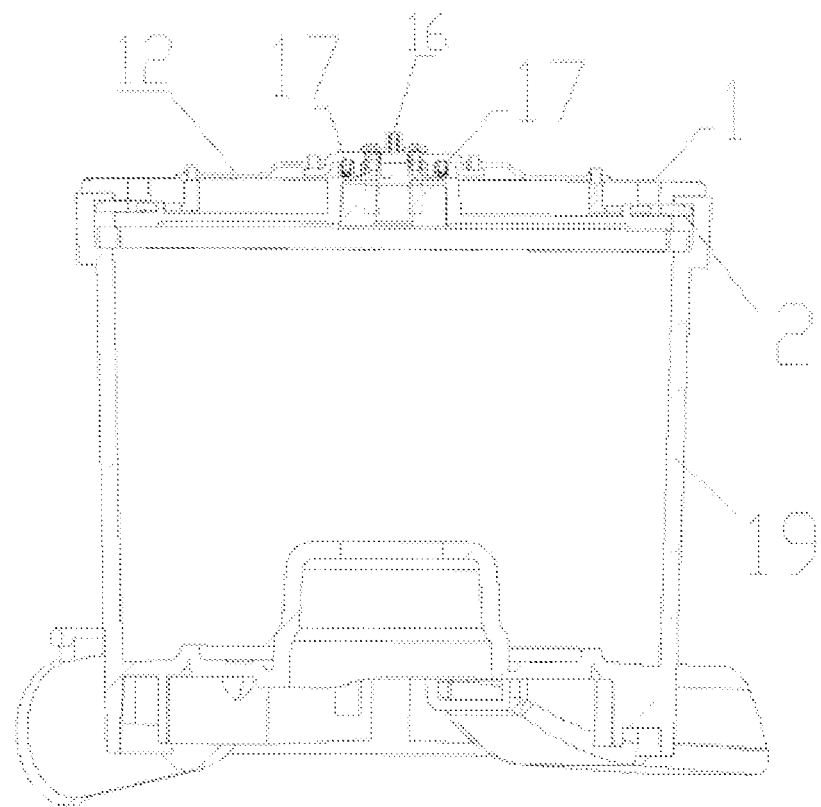
FIG. 8 is a structure diagram of an original juice machine adopting a first uncovering assembly provided in the second embodiment according to the present disclosure.

Meanwhile, in the embodiment, as shown in FIG. 7, a transmission mechanism includes: a first gear 13 arranged on the rotary disc 11, a connecting rod 12, one end of the connecting rod 12 being fixedly connected with a lock catch 2 and another end is provided with a rack structure 14, and at least one transmission gear, the at least one transmission gear including a third gear 151 and a fourth gear 152 rotating axially. The third gear 151 is meshed with the first gear 13, and the fourth gear 152 is meshed with the rack structure 14. One end of the at least one transmission gear is in meshed connection with the first gear 13, and another end in meshed connection with the rack structure 14.

The rotary disc 11 rotatably drives the first gear 13 to rotate, the first gear 13 drives the third gear 151 to move, the third gear 151 drives the fourth gear 152 to rotate, the fourth gear 152 drives the rack structure 14 to move, and the rack structure 14 is connected with the lock catch 2. In this way, rotation of the rotary disc 11 is converted to reciprocation of the lock catch 2.

Figure 9:
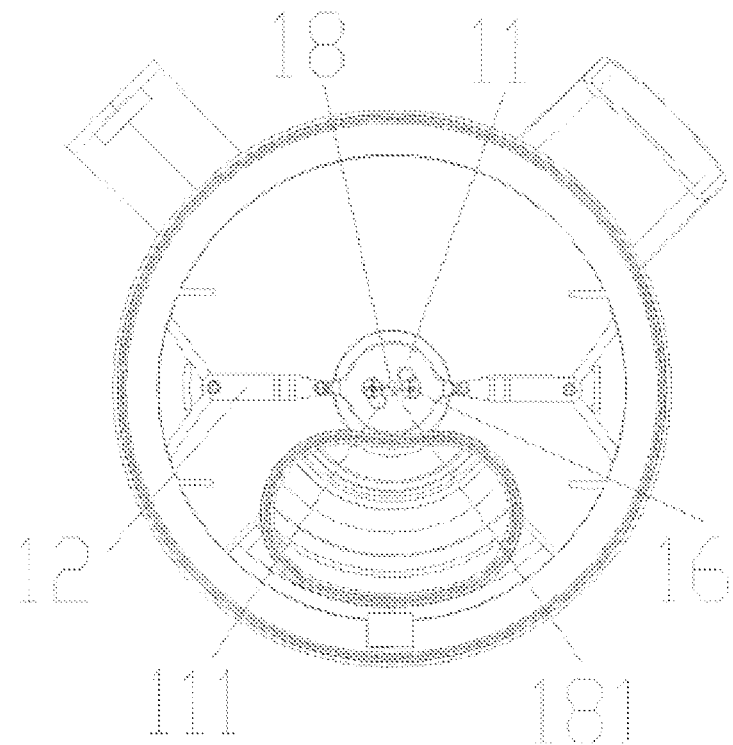
FIG. 9 is a schematic diagram of a second unfastening assembly and a lock catch provided in the second embodiment according to the present disclosure at a fastening position.
Figure 10:
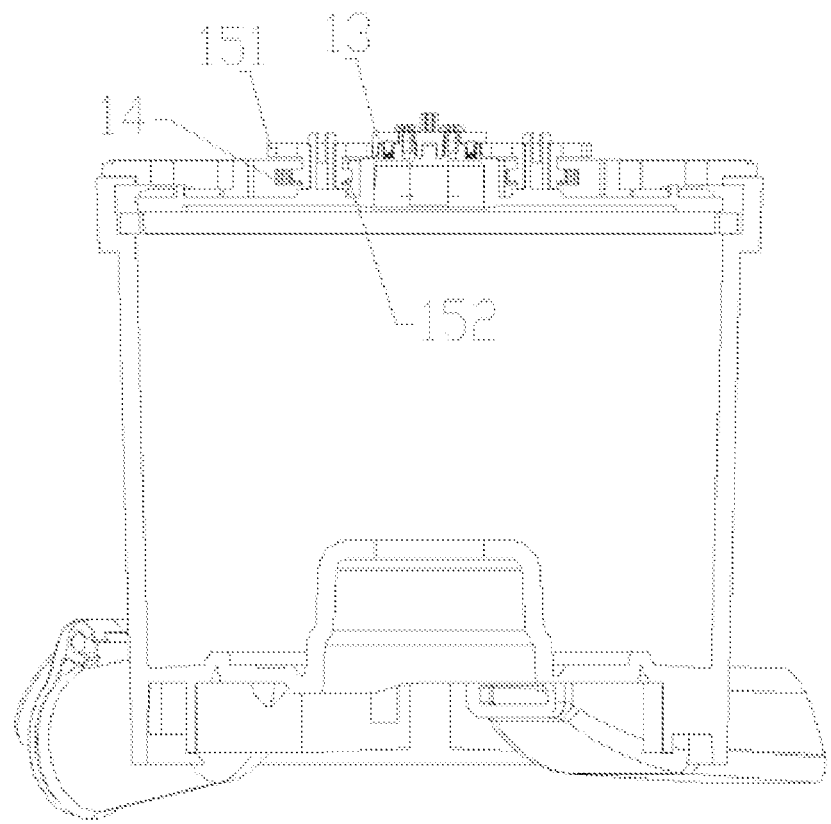
FIG. 10 is a structure diagram of an original juice machine adopting a first uncovering assembly provided in the second embodiment according to the present disclosure.

As a variation, as shown in FIG. 9, the transmission mechanism directly takes the connecting rod 12 rather than takes a gear rack transmission mechanism, and two ends of the connecting rod 12 are connected with the lock catch 2 and the rotary disc 11, respectively.

In the embodiment, as shown in FIG. 7, in order to limit a rotating distance of the rotary disc 11, a fixed column 16 and a waist-type hole 111 are arranged. Specifically, the waist-type hole 111 is moulded on the rotary disc 11, and the fixed column 16 passes through the waist-type hole 111 to connect with the cover 1. Through the cooperation of the fixed column 16 and the waist-type hole 111, the rotary disc 11 rotates within a scope between a first position and a second position. In this way, the lock catch 2 is limited to move between an unfastening position and a fastening position, and accordingly it is conducive to preventing excessive movement of the lock catch 2.

Specifically, two waist-type holes 111 are symmetrically arranged relative to a center of the rotary disc 11. In this way, the rotary disc 11 is symmetrically restricted, and accordingly the rotary disc 11 is prevented from inclining due to an uneven stress when a single side is restricted.

In the embodiment, the fixed column 16 is a screw. As a variation, the fixed column 16 directly takes a pin.

As shown in FIG. 7, in the embodiment, the cover 1 is provided with a biasing part 17 having a biasing force far away from a direction of the cover 1. A first embedding hole corresponding to the first position and a second embedding hole corresponding to the second position are moulded on the rotary disc 11, and the biasing part 17 is embedded into the first embedding hole or the second embedding hole to stabilize the rotary disc 11 at the first position and the second position.

Specifically, when rotating to the first position, the biasing part 17 is embedded into the first embedding hole, and when rotating to the second position, the biasing part 17 is embedded into the second embedding hole. Through the cooperation of the biasing part 17 and the different embedding holes, the rotary disc 11 is stabilized at the first position or the second position, in this way the lock catch 2 is ensured to be stabilized at the unfastening position or the fastening position, and it is conducive to stably connecting or separating the shell 19 and the cover.

Specifically, the biasing part 17 consists of the pin and a spring jointly. The spring provides a biasing force facing the rotary disc 11, in this way the pin may timely enter into the first embedding hole or the second embedding hole.

In the embodiment, in order to apply an acting force to the rotary disc 11, a drive shaft 18 is arranged on a side of the rotary disc 11 far away from the cover 1, and a through hole 181 is moulded inside the drive shaft 18 along an axial direction. Thus, a screwdriver directly acts inside the through hole 181 to enable the drive shaft 18 to drive the rotary disc 11 to rotate.

Third Embodiment

The embodiment provides a household appliance, including: a shell 19 being provided with a positioning structure and a fastening structure 3, and the uncovering assembly being the one mentioned in the first embodiment or the second embodiment. A positioning portion of the uncovering assembly cooperates with the positioning structure, as to prevent a cover 1 from rotating relative to the shell 19. A fastening end of a lock catch 2 at a fastening position extends out of the cover 1 to cooperate with the fastening structure 3 of the shell 19 in a fastening manner, as to prevent the cover 1 from vertically moving relative to the shell 19.

In some embodiments, the positioning portion is a limiting rib 20 arranged on a periphery of the cover 1 and configured to face the shell 19, and the positioning structure is a limiting groove 21 cooperating with the limiting rib 20. Specifically, the fastening structure 3 is at least one block rib arranged to protrude inward along a periphery of an opening of the shell 19. The fastening end of the lock catch 2 at the fastening position extends to a place under the corresponding block rib and cooperates with the block rib 101. In the embodiment, as an alternative, positions of the limiting rib 20 and the limiting groove 21 are exchangeable.

As a variation, the positioning portion and the positioning structure are a pair of magnetic assemblies attracting each other.

In the embodiment, the household appliance is a juicer. Specifically, the juicer is an original juice machine, wherein, the shell 19 is a juice barrel of the original juice machine.

It is apparent that the abovementioned embodiments are merely examples listed for clear explanation and not intended to limit the embodiments. Those of ordinary skill in the art may also make other variations and modifications of different forms on the basis of the abovementioned description. All embodiments do not need to be listed one by one and may not be listed one by one herein. Obvious variations or modifications derived here from shall still fall within the scope of protection of the present disclosure.

Beside the abovementioned contents, it is to be noted again that "an embodiment", "another embodiment", "embodiment" and the like mentioned in the description are defined to be contained in at least one embodiment summarized and described in the disclosure in combination with specific features, structures and characteristics described in the embodiments. An identical expression occurring at many places of the description does not mean the identical embodiment. Further, when describing one specific feature, structure or characteristic in combination with any embodiment, it is claimed that achievement of the feature, the structure or characteristic in combination with other embodiments shall fall within the scope of the present disclosure.

In the abovementioned embodiments, the description of each embodiment has its own emphasis. For the part not described in detail in one embodiment, the relevant description of other embodiments may be used for reference.

The above are some embodiments of the present disclosure and not intended to limit the present disclosure. For those skilled in the art, the present disclosure may have various modifications and variations. Any modifications, equivalent replacements, improvements and the like within the spirit and principle of the present disclosure shall fall within the scope of protection of the present disclosure.

What is claimed is:

1. An uncovering assembly for a household appliance, comprising:
    a cover;
    a positioning portion, arranged on the cover, and cooperating with a positioning structure on a shell of the household appliance to prevent the cover from rotating relative to the shell; and
    a lock catch, arranged on the cover in a manner of reciprocating movement between a fastening position and an unfastening position, the lock catch switching from the unfastening position to the fastening position after the positioning portion cooperates with the positioning structure, and a fastening end of the lock catch at the fastening position extending out of the cover to cooperate with a fastening structure of the shell in a fastening manner, so as to prevent the cover from moving vertically relative to the shell;
    an unfastening assembly, and the unfastening assembly comprising a switching part movably arranged on the cover and a transmission mechanism arranged between the switching part and the lock catch and arranged to drive the lock catch to switch between the fastening position and the unfastening position;
    a switching part sliding groove arranged on the cover fixedly, and the switching part being a sliding block arranged inside the switching part sliding groove slidably.

2. The uncovering assembly for the household appliance as claimed in claim 1, further comprising a slideway fixedly arranged on the cover, and the lock catch being arranged inside the slideway slidably.

3. The uncovering assembly for the household appliance as claimed in claim 1, wherein, the fastening end of the lock catch at the fastening position extends to a place under the fastening structure of the shell to cooperate with the fastening structure in the fastening manner.

4. The uncovering assembly for the household appliance as claimed in claim 1, wherein, the lock catch is a tripod structure, a top end of the tripod structure is connected with the transmission structure, and a bottom side opposite to the top end is the fastening end.

5. The uncovering assembly for the household appliance as claimed in claim 1, wherein, the switching part has a first position and a second position, wherein, the first position corresponds to the fastening position of the lock catch, and the second position corresponds to the unfastening position of the lock catch.

6. The uncovering assembly for the household appliance as claimed in claim 1, wherein, the sliding block is provided with two elastic fasteners, sawtooth grooves corresponding to the two elastic fasteners are moulded inside the switching part sliding groove, and when the sliding block switches between the first position and the second position, the two elastic fasteners get close to each other and jump into a sawteeth that are in front of a motion path.

7. The uncovering assembly for the household appliance as claimed in claim 6, wherein, the uncovering assembly further comprises a switching lock catch arranged between the sliding block and the switching part sliding groove, wherein the switching lock catch is mounted on the switching part sliding groove slidably, the switching lock catch has a clamping position for locking the sliding block on the switching part sliding groove and a free position for enabling the sliding block to slide along the switching part sliding groove freely.

8. The uncovering assembly for the household appliance as claimed in claim 7, wherein, the switching lock catch is provided with a block rib, and when the switching lock catch moves to the clamping position from the free position, the block rib blocks between the two elastic fasteners, as to prevent the elastic fasteners from being deformed and jumping into an adjacent sawteeth.

9. The uncovering assembly for the household appliance as claimed in claim 8, wherein, block rib grooves are provided on the two elastic fasteners respectively, and when the block rib moves to the clamping position, the block rib enters into the block rib grooves to limit movement of the block rib.

10. An household appliance, comprising:
a shell, the shell being provided with a positioning structure and a fastening structure; and
the uncovering assembly as claimed in claim 1,
wherein the positioning portion of the uncovering assembly cooperates with the positioning structure, as to prevent the cover from rotating relative to the shell, and the fastening end of the lock catch at the fastening position extends out of the cover to cooperate with the fastening structure of the shell in the fastening manner as to prevent the cover from vertically moving relative to the shell.

11. The household appliance as claimed in claim 10, wherein, the positioning portion is a limiting rib arranged on a periphery of the cover and arranged to face the shell, and the positioning structure is a limiting groove cooperating with the limiting rib; or the positioning portion is a limiting groove arranged on a periphery of the cover and arranged to face the shell, and the positioning structure is a limiting rib cooperating with the limiting groove.

12. The household appliance as claimed in claim 10, wherein, the fastening structure is at least one block rib arranged to protrude inward along a periphery of an opening of the shell, and the fastening end of the lock catch at the fastening position extends to a place under a corresponding block rib and contacts with the block rib.

13. An uncovering assembly for a household appliance, comprising:
a cover;
a positioning portion, arranged on the cover, and cooperating with a positioning structure on a shell of the household appliance to prevent the cover from rotating relative to the shell; and
a lock catch, arranged on the cover in a manner of reciprocating movement between a fastening position and an unfastening position, the lock catch switching from the unfastening position to the fastening position after the positioning portion cooperates with the positioning structure, and a fastening end of the lock catch at the fastening position extending out of the cover to cooperate with a fastening structure of the shell in a fastening manner, so as to prevent the cover from moving vertically relative to the shell;
an unfastening assembly, and the unfastening assembly comprising a switching part movably arranged on the cover and a transmission mechanism arranged between the switching part and the lock catch and arranged to drive the lock catch to switch between the fastening position and the unfastening position;
wherein, the switching part is a rotary disc rotatably connected with the cover;
wherein, the transmission mechanism comprises:
a first gear, arranged on the rotary disc;
a connecting rod, one end of the connecting rod being fixedly connected with the lock catch, and another end of the connecting rod being provided with a rack structure; and
at least one transmission gear, one end of the at least one transmission gear being in meshed connection with the first gear and another end of the at least one transmission gear being in meshed connection with the rack structure.

14. The uncovering assembly for the household appliance as claimed in claim 13, wherein, the at least one transmission gear comprises a third gear and a fourth gear rotating coaxially, the third gear is meshed with the first gear, and the fourth gear is meshed with the rack structure.

15. The uncovering assembly for the household appliance as claimed in claim 13, wherein, a waist-type hole is moulded on the rotary disc, and a fixed column passes through the waist-type hole to connect to the cover, and through a cooperation of the fixed column and the waist-type hole, the rotary disc rotates within a scope between the first position and the second position.

16. The uncovering assembly for a household appliance as claimed in claim 13, wherein, the cover is provided with a biasing part having a biasing force far away from a direction of the cover;
a first embedding hole corresponding to the first position and a second embedding hole corresponding to the second position are moulded on the rotary disc, and the biasing part is embedded into the first embedding hole or the second embedding hole as to stabilize the rotary disc at the first position and the second position.

17. The uncovering assembly for a household appliance as claimed in claim 16, wherein, a drive shaft is arranged on a side, far away from the cover, of the rotary disc, a through hole is moulded inside the drive shaft along an axial direction, and an external force is applied to an inner part of the through hole to enable the drive shaft to drive the rotary disc to rotate.

* * * * *